United States Patent Office 3,271,994
Patented Sept. 13, 1966

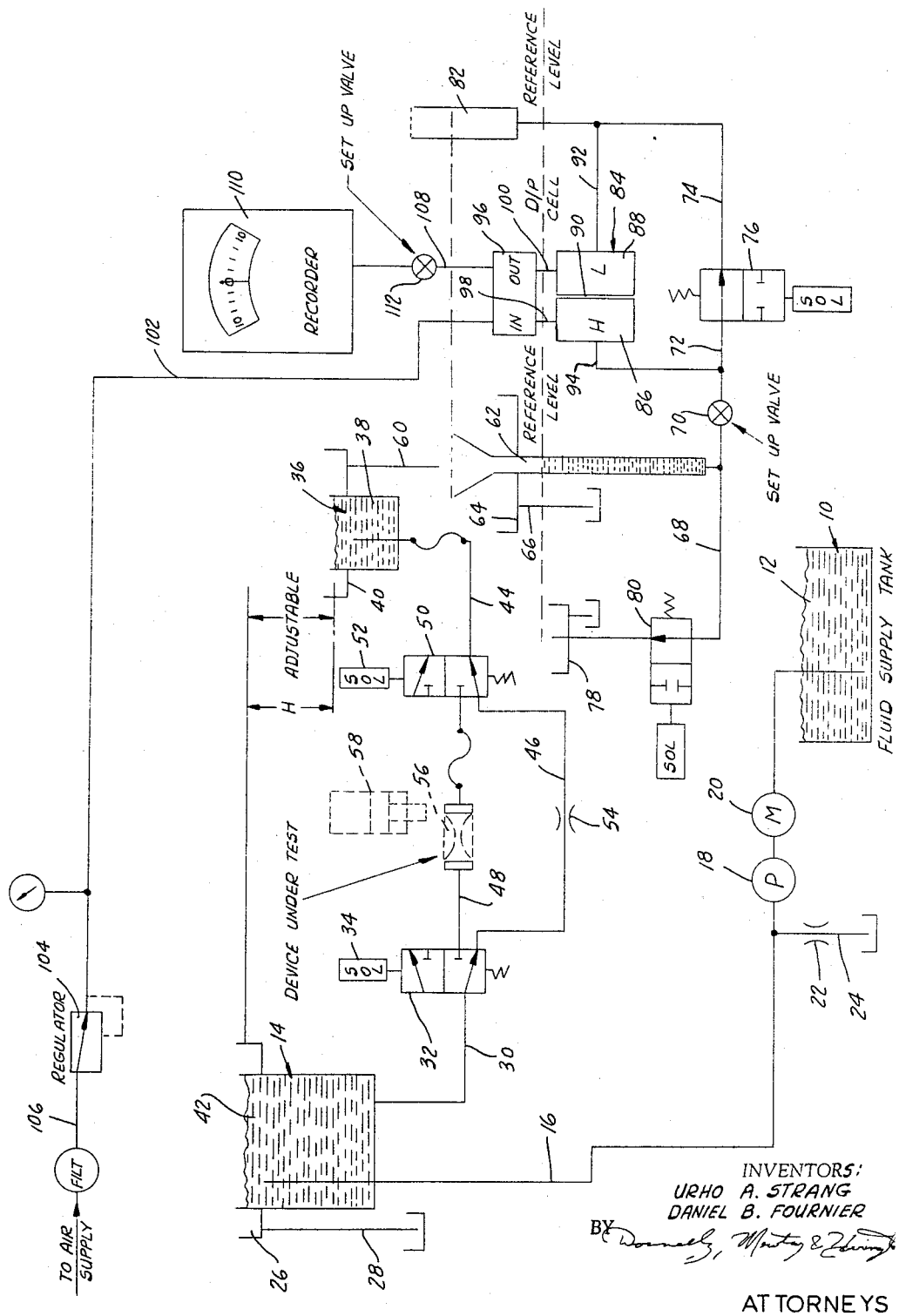

3,271,994
FLUID FLOW COMPARATOR FOR USE IN
CALIBRATING FLUID FLOW ORIFICES
Daniel B. Fournier, Roseville, and Urho A. Strang,
Livonia, Mich., assignors to Jered Industries, Inc.,
Birmingham, Mich., a corporation of Michigan
Filed Apr. 19, 1965, Ser. No. 449,060
9 Claims. (Cl. 73—3)

Our invention relates generally to fluid flow test apparatus, and more particularly to a flow test mechanism for calibrating precisely fluid flow orifices.

It is an object of our invention to provide a flow test apparatus capable of comparing the fluid flow characteristics of a test orifice with the corresponding characteristics of an orifice having known dimensions.

It is a further object of our invention to provide a flow test apparatus capable of comparing the characteristics of one orifice with the characteristics of a precalibrated orifice by subjecting the test orifice to a known pressure head and measuring precisely the flow of fluid through the orifice under the influence of that known head. In a preferred form of our invention, the flow is determined by using a so-called standpipe which receives, during a given test interval, the flow through the orifice. A pressure head that is created in the standpipe is measured by means of a diaphragm cell which responds to an increase in the height of the fluid in the standpipe to provide a visual indication of the pressure differential across its opposed pressure chambers. The degree of the pressure differential across the diaphragm cell during a given test interval thus is an indicator of the flow rate through the orifice.

The provision of a test apparatus of the type above set forth being a principal object of our invention, it is a further object of our invention to provide a flow test device capable of measuring accurately the fluid flow through the orifice and comparing the flow with the flow through a master orifice that may be situated in parallel relationship with respect to the test orifice.

By employing the apparatus of our invention, accurate test procedures can be established for measuring the orifice characteristics of orifice elements used in various control systems, such as automobile vehicle carburetors or automatic fuel control systems.

Further objects and features of our invention will become apparent from the following description and from the accompanying drawing which shows, in schematic form, a circuit diagram for the valve structure of our improved testing device.

In the drawing numeral 10 designates a fluid supply tank for a test fluid 12. A first auxiliary reservoir 14 is situated at a level higher than the level of the tank 10. Reservoir 14 is connected hydraulically with the tank 10 through a feed passage 16. Fluid from tank 10 is pumped through the passage 16 by means of a fluid pump 18 powered by a motor 20. A flow controlling adjustable orifice 22 is situated in a parallel flow passage 24 which communicates with the reservoir of which the tank 10 forms a part.

The reservoir 14 has an overflow arrangement comprising a collecting trough 26 and an overflow return passage 28 which communicates with the tank 10.

Auxiliary reservoir 14 communicates with a fluid flow conduit 30 which extends to a first solenoid valve 32. Valve 32 has two operating positions, and each position is achieved by means of a solenoid operator 34.

A second auxiliary reservoir 36 is located in the system at a lower level than the level of reservoir 14. It contains fluid 38 which can overflow into a trough 40. The level of the fluid 38 is lower than the level of the fluid 42 in reservoir 14 by a known dimension H. Provision may be made for varying the magnitude of the dimension H by adjustably positioning the relative positions of the reservoirs 14 and 36.

Reservoir 36 is supplied with fluid through a conduit 44. A pair of branch conduits 46 and 48 interconnect conduit 30 and conduit 44. Communication between conduit 44 and conduits 46 and 48 is established by a second solenoid operated valve 50 having a solenoid operator 52. Like valve 32, valve 50 has two operating positions.

A precalibrated orifice 54 is situated in branch conduit 46. Branch conduit 48 is adapted to receive a test orifice 56. Provision may be made for clamping test orifice 56 in place for this purpose. The orifice clamping device 58 is illustrated in the drawing by means of phantom lines.

When the valves 32 and 50 assume the position shown in the drawing, communication is established between conduits 30 and 44 through branch conduit 46. On the other hand, if the solenoid valves 32 and 50 assume the other operating positions, communication between conduit 30 and branch conduit 46 and between conduit 44 and branch conduit 46 is interrupted while communication between conduit 30 and branch conduit 48 and between branch conduit 48 and conduit 44 is established.

Overflow trough 40 communicates with the drain passage 60. A standpipe 62 is situated directly under passage 60 so that it can receive fluid that is passed through passage 60 under the force of gravity. If standpipe 62 overflows, the fluid that overflows is collected in a trough 64 and passed through a drain passage 66 to the tank 10.

The base of the standpipe 62 communicates with a passage 68. The standpipe 62 is formed with a precise bore of unchanging diameter. Passage 68 communicates through a manually operated set-up valve 70 with the passage 72. This passage is adapted to communicate with a passage 74 through a two-position solenoid operated valve 76. When the valve 76 is positioned as shown, passages 72 and 74 are in communication. If the solenoid valve 76 assumes its other position, communication between passages 72 and 74 is interrupted.

Passage 68 communicates also with a fluid accumulator 78 through a solenoid operated valve 80. When the valve 80 assumes the position shown, passage 68 communicates freely with accumulator 78. The accumulator 78 acts as an overfill device which communicates with the tank 10 as indicated.

Passage 74 extends to an accumulator tank 82 which is open to atmosphere.

A diaphragm cell generally indicated by reference character 84 includes a pair of pressure chambers 86 and 88 which are separated by a flexible diaphragm 90. Chamber 88 is in fluid communication with passage 74 through a branch passage 92. In a similar fashion chamber 86 is in fluid communication with conduit 72 through a passage 94.

A pressure amplifier 96 is connected mechanically with diaphragm 90. It sense the differential pressure in the cell 84. Amplifier 96 receives regulated air pressure through an air pressure delivery passage 102. An air pressure regulator 104 in passage 102 maintains the pressure in passage 102 at approximately 20 p.s.i. Regulator 104 is supplied with pressure from a conventional air supply through a passage 106.

Amplifier 96 modulates the air pressure from the passage 102 in response to changes in the pressure differential in chambers 86 and 88. This establishes a test pressure signal in passage 108 that is measured by a suitable electrical recording instrument 110. If desired, the recording instrument 110 can be isolated from the rest of the circuit by means of the manually operated shut-off valve 112 for set-up purposes.

During operation of the instrument, a test orifice, such as that shown at 56, can be clamped in place by means of the clamping device 58. As the clamping device is actuated, the circuits for the solenoid operators 34 and 52 are closed, thereby allowing the fluid in reservoir 14 to pass through the opened valves 32 and 50 to reservoir 38. Pump 18 continuously supplies fluid to the reservoir 14. During the period that the test orifice is placed in the system, a continuous flow occurs through the valves 32 and 50 and through the orifice 54 from reservoir 14 to the reservoir 36. This causes an overflow to pass through overflow passage 60 and standpipe 62 to the passage 68. Valve 80 is open under these conditions. Therefore the level of the fluid is maintained by the spillage trough 78. This level is referred to as a so-called "reference level" as indicated in the diagrammatic circuit drawing. Valve 76 also is opened under these conditions, but the level of fluid in passage 74 seeks the level of the fluid in the standpipe 62. The pressure in chambers 86 and 88 of the diagram cell 84 are equal.

Upon starting the test, the valves 50 and 32 are moved to introduce the test orifice 56 into the fluid system. Thus all of the flow passes through the test orifice 56 and the flow through orifice 54 ceases. After a predetermined time interval, which is measured by an electrical timer, valves 80 and 76 are closed by their associated solenoid operators. This isolates chamber 88 from chamber 86. It also interrupts communication between standpipe 62 and the overflow trough 78. The fluid will continue to pass through the overflow passage 60 thereby allowing the level of the fluid in the standpipe 62 to increase. As the level increases, the pressure head created by the fluid in the standpipe increases. This increase in pressure head causes an increase in the pressure in chamber 86 to a value that is greater than the pressure in chamber 88. After a predetermined time interval has passed, a reading is taken on the recording instrument 110. This will show an indication of pressure. Since the reading is taken after a predetermined time interval following the closing of the valves 76 and 80, the magnitude of the pressure read by instrument 110 is a direct indication of the flow through the orifice 56.

By employing a master orifice of known characteristics, the characteristics of any test orifice 56 can be compared to the known characteristics of the master orifice. This is done by repeating the test after the master orifice has been used to calibrate the set points of the recorder.

Valves 112 and 70 normally are open. They are closed when the device is being set up for any given test installation.

The flow of fluid through the orifices 56 and 54 could be controlled selectively by means of one valve such as that shown at 32. The additional valve shown at 50 is used, however, to prevent backflow of fluid from the reservoir 38 when the device 56 is removed from the system. The presence of the valve 50 will permit the device 56 to be mounted at a lower level than the level of the fluid in reservoir 36.

Having thus described a preferred form of our invention, what we claim and desire to secure by U.S. Letters Patent is:

1. In a fluid flow measuring instrument for calibrating a fluid flow orifice, first and second fluid reservoirs, conduit structure interconnecting said reservoir, each reservoir containing liquid, the level of liquid in one reservoir being lower than the liquid level of the other reservoir, means for supplying fluid to said other reservoir, said conduit structure being adapted to accommodate a test device in the form of an orifice, means for selectively establishing and interrupting flow of fluid from one reservoir to the other through said test device, means for collecting the liquid displaced by said one reservoir in a collector of variable depth, and means for recording the accumulated pressure head in said collector following a predetermined time interval, the magnitude of the pressure head accumulated during said interval thereby being a measure of the flow through said orifice.

2. A flow measuring instrument for determining the rate of flow through a test orifice comprising a pair of fluid reservoirs, each reservoir containing liquid, the level of the liquid in one reservoir being lower than the level of the liquid in the other reservoir, means for supplying fluid to said other reservoir, conduit structure interconnecting said reservoirs for accommodating flow from said other reservoir to said one reservoir, means for introducing into said conduit structure a test orifice, valve means for establishing and interrupting flow of fluid through said conduit structure, a collector for receiving fluid displaced from said one reservoir, a pressure recording instrument comprising a pair of pressure chambers and a flexible diaphragm disposed therebetween, passage means for distributing pressure head from said collector to each of said chambers thereby producing a balanced hydrostatic pressure in said chambers, valve means for isolating one chamber with respect to the other, and recording means for determining the pressure differential in said chambers after said chambers are isolated, the change in pressure for any given time interval thereby being a measure of the flow through said test orifice.

3. In a fluid test instrument for measuring a rate of flow of fluid through a test orifice, conduit structure, means for introducing the test orifice into said conduit structure, a source of predetermined pressure head for maintaining a pressure differential across said orifice, valve means for selectively establishing and interrupting flow through said orifice, a collector for receiving the fluid passed through said conduit structure, the differential pressure level in said collector being adapted to increase as flow continues to occur in said conduit structure, a recording instrument comprising a pair of pressure chambers, each pressure chamber being in fluid communication with said collector, valve means for interrupting the communication between said chambers thereby isolating one chamber with respect to the other, and recording means for measuring the pressure build-up in the one chamber after said chambers are isolated and after the passage of a predetermined time interval, the magnitude of the pressures being measured thereby being a measure of the rate of flow of the fluid through said orifice.

4. In a fluid flow measuring instrument for calibrating a fluid flow orifice, first and second fluid reservoirs, conduit structure interconnecting said reservoirs, each reservoir containing liquid, the level of liquid in one reservoir being lower than the liquid level of the other reservoir, means for supplying fluid to said other reservoir, said conduit structure being adapted to accommodate a test device in the form of an orifice, valve means for selectively establishing and interrupting flow of fluid from one reservoir to the other through said test device, means for collecting the liquid displaced by said one reservoir in a collector of variable depth, means for recording the accumulated pressure head in said collector following a predetermined time interval, the magnitude of the pressure head accumulated during said interval thereby being a measure of the flow through said orifice, and parallel branch passage means in parallel disposition with respect to said orifice and forming a part of said conduit structure, said valve means selectively distributing pressure from said other reservoir to said orifice and said branch passage means.

5. A flow measuring instrument for determining the rate of flow through a test orifice comprising a pair of fluid reservoirs, each reservoir containing liquid, the level of the liquid in one reservoir being lower than the level of the liquid in the other reservoir, means for supplying fluid to said other reservoir, conduit structure interconnecting said reservoirs for accommodating flow from said other reservoir to said one reservoir, means for introducing into said conduit structure a test orifice, valve means for establishing and interrupting flow of fluid through said conduit structure, a collector for receiving fluid displaced from said one reservoir, a pressure recording instrument comprising a pair of pressure chambers and a flexible diaphragm disposed therebetween, passage means for distributing pressure head from said collector to each of said chambers thereby producing a balanced hydrostatic pressure in said chambers, valve means for isolating one chamber with respect to the other, and recording means for determining the pressure differential in said chambers after said chambers are isolated, the change in pressure for any given time interval thereby being a measure of flow through said test device, and, branch passage means in parallel disposition with respect to said orifice and forming a part of said conduit structure, said first named valve means selectively distributing pressure from said other reservoir to said orifice and said branch passage means.

6. In a fluid test instrument for measuring a rate of flow of fluid through a test orifice conduit structure, means for introducing a test orifice into said conduit structure, a source of predetermined pressure head for maintaining a pressure differential across said orifice, valve means for selectively establishing and interrupting flow through said orifice, a collector for receiving the fluid passed through said conduit structure, the differential pressure level in said collector being adapted to increase as flow continues to occur in said conduit structure, a recording instrument comprising a pair of pressure chambers, each pressure chamber being in fluid communication with said collector, valve means for interrupting the communication between said chambers thereby isolating one chamber with respect to the other, recording means for measuring the pressure build-up in the one chamber after said chambers are isolated and after the passage of a predetermined time interval, the magnitude of the pressures being measured thereby being a measure of the rate of flow of the fluid through said orifice and, parallel branch passage means in parallel disposition with respect to said orifice and forming a part of said conduit structure, said valve means selectively distributing pressure from said other reservoir to said orifice and said branch passage means.

7. In a fluid flow measuring instrument for calibrating a fluid flow orifice, first and second fluid reservoirs, conduit structure interconnecting said reservoirs, each reservoir containing liquid, the level of liquid in one reservoir being lower than the liquid level of the other reservoir, means for supplying fluid to said other reservoir, said conduit structure being adapted to accommodate a test device in the form of an orifice, valve means for selectively establishing and interrupting flow of fluid from one reservoir to the other through said test device, means for collecting the liquid displaced by said one reservoir in a collector of variable depth, and means for recording the accumulated pressure head in said collector following a predetermined time interval, the magnitude of the pressure head accumulated during said interval thereby being a measure of the flow through said orifice, said recording means including an amplifier means for augmenting the magnitude of the pressure head to produce an increased modulated output pressure signal and for distributing said output pressure signal to pressure sensitive portions of said recording means, said amplifier means being in fluid communication with a source of regulated supply pressure which energizes the same.

8. A flow measuring instrument for determining the rate of flow through a test orifice comprising a pair of fluid reservoirs, each reservoir containing liquid, the level of the liquid in one reservoir being lower than the level of the liquid in the other reservoir, means for supplying fluid to said other reservoir, conduit structure interconnecting said reservoirs for accommodating flow from said other reservoir to said one reservoir, means for introducing into said conduit structure a test orifice, valve means for establishing and interrupting flow of fluid through said conduit structure, a collector for receiving fluid displaced from said one reservoir, a pressure recording instrument comprising a pair of pressure chambers and a flexible diaphragm disposed therebetween, passage means for distributing pressure head from said collector to each of said chambers thereby producing a balanced hydrostatic pressure in said chambers, valve means for isolating one chamber with respect to the other, and recording means for determining the pressure differential in said chambers after said chambers are isolated, the change in pressure for any given time interval thereby being a measure of the flow through said test device, said recording means including an amplifier means for augmenting the magnitude of the pressure head to produce an increased modulated output pressure signal and for distributing said output pressure signal to pressure sensitive portions of said recording means, said amplifier means being in fluid communication with a source of regulated supply pressure which energizes the same.

9. In a fluid test instrument for measuring a rate of flow of fluid through a test orifice conduit structure, means for introducing a test orifice into said conduit structure, a source of predetermined pressure head for maintaining a pressure differential across said orifice, valve means for selectively establishing and interrupting flow through said orifice, a collector for receiving the fluid passed through said conduit structure, the differential pressure level in said collector being adapted to increase as flow continues to occur in said conduit structure, a recording instrument comprising a pair of pressure chambers, each pressure chamber being in fluid communication with said collector, valve means for interrupting the communication between said chambers thereby isolating one chamber with respect to the other, and recording means for measuring the pressure build-up in the one chamber after said chambers are isolated and after the passage of a predetermined time interval, the magnitude of the pressures being measured thereby being a measure of the rate of flow of the fluid through said orifice, said recording means including an amplifier means for augmenting the magnitude of the pressure head to produce an increased modulated output pressure signal and for distributing said output pressure signal to pressure sensitive portions of said recording means, said amplifier means being in fluid communication with a source of regulated supply pressure which energizes the same.

References Cited by the Examiner
UNITED STATES PATENTS 2,790,320    4/1957    Salko et al. _____ 73—3
3,148,527    9/1964    Lindquist _____ 73—3

LOUIS R. PRINCE, *Primary Examiner.*